(12) United States Patent
Murouchi et al.

(10) Patent No.: US 9,340,647 B2
(45) Date of Patent: May 17, 2016

(54) LIQUID CRYSTAL POLYESTER AMIDE, LIQUID CRYSTAL POLYESTER AMIDE RESIN COMPOSITION, AND MOLDED ARTICLE

(71) Applicant: JX NIPPON OIL & ENERGY CORPORATION, Tokyo (JP)

(72) Inventors: Satoshi Murouchi, Tokyo (JP); Kiichiro Nishimura, Tokyo (JP); Masatoshi Ando, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/375,546

(22) PCT Filed: Jan. 29, 2013

(86) PCT No.: PCT/JP2013/051871
§ 371 (c)(1),
(2) Date: Jul. 30, 2014

(87) PCT Pub. No.: WO2013/115168
PCT Pub. Date: Aug. 8, 2013

(65) Prior Publication Data
US 2015/0010744 A1   Jan. 8, 2015

(30) Foreign Application Priority Data
Jan. 31, 2012   (JP) .................... 2012-018997

(51) Int. Cl.
| C08G 69/44 | (2006.01) |
| C08K 3/00 | (2006.01) |
| C08L 77/12 | (2006.01) |
| C08K 7/14 | (2006.01) |

(52) U.S. Cl.
CPC . *C08G 69/44* (2013.01); *C08K 7/14* (2013.01); *C08L 77/12* (2013.01)

(58) Field of Classification Search
None
See application file for complete search history.

(56) References Cited

U.S. PATENT DOCUMENTS

| 4,758,636 A * | 7/1988 | Hijikata et al. ............ 525/438 |
| 5,670,608 A | 9/1997 | Oka et al. |
| 2007/0243376 A1* | 10/2007 | Tachikawa et al. ......... 428/364 |

FOREIGN PATENT DOCUMENTS

| CN | 1161052 | 10/1997 |
| CN | 1196738 | 10/1998 |
| CN | 1048743 | 1/2000 |
| JP | 57-177019 | 10/1982 |

(Continued)

OTHER PUBLICATIONS

International Preliminary Report on Patentability and Written Opinion issued with respect to application No. PCT/JP2013/051871, mail date is Aug. 14, 2014.

(Continued)

*Primary Examiner* — Ana Woodward
(74) *Attorney, Agent, or Firm* — Greenblum & Bernstein, P.L.C.

(57) ABSTRACT

A liquid crystal polyester amide of the present invention includes 10 mol % to 65 mol % of a structural unit represented by the following formula (1), 3 mol % to 17.5 mol % of a structural unit represented by the following formula (2), 5 mol % to 20 mol % of a structural unit represented by the following formula (3), 7.5 mol % to 42 mol % in total of at least one of a structural unit represented by the following formula (4-1) and a structural unit represented by the following formula (4-2), and 2.5 mol % to 40 mol % in total of at least one of a structural unit represented by the following formula (5-1) and a structural unit represented by the following formula (5-2), and has a melting point of 300° C. or higher.

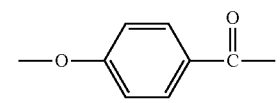

(1)

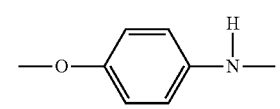

(2)

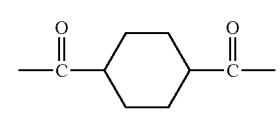

(3)

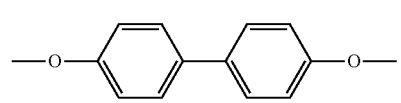

(4-1)

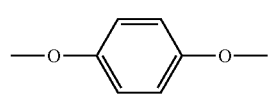

(4-2)

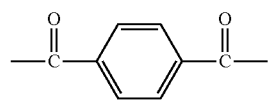

(5-1)

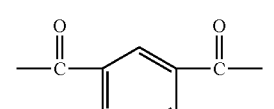

(5-2)

13 Claims, 3 Drawing Sheets

(56) References Cited

FOREIGN PATENT DOCUMENTS

| JP | H2-004822 | 1/1990 |
|---|---|---|
| JP | H4-227657 | 8/1992 |
| JP | H5-170902 | 7/1993 |
| JP | 5-287059 | 11/1993 |
| JP | H7-228690 | 8/1995 |
| JP | H10-219085 | 8/1998 |
| JP | 2002-503286 | 1/2002 |
| JP | 2005-060455 | 3/2005 |
| JP | 2008-029354 | 2/2008 |
| JP | 2008-088322 | 4/2008 |
| JP | 2010-199437 | 9/2010 |
| JP | 2012-224689 | 11/2012 |
| JP | 2002-363281 | 12/2012 |
| TW | 200600567 | 1/2006 |

OTHER PUBLICATIONS

Taiwanese Office Action in respect to Taiwanese Application No. 102103828, dated Feb. 15, 2016.

* cited by examiner

LIQUID CRYSTAL POLYESTER AMIDE, LIQUID CRYSTAL POLYESTER AMIDE RESIN COMPOSITION, AND MOLDED ARTICLE

TECHNICAL FIELD

The present invention relates to a liquid crystal polyester amide, a liquid crystal polyester amide resin composition, and a molded article.

BACKGROUND ART

Since in a case of manufacturing surface mounting parts such as a connector of a mobile terminal, both thin-wall moldability and solder heat resistance are required, wholly aromatic liquid crystal polyester with high strength, high heat resistance, and high fluidity is used (for example, see Patent Literature 1 below). However, since rigidity of the wholly aromatic liquid crystal polyester is high, whereas flexibility is low and toughness is also low, in a case where parts of which a resin portion is deformed at the time of inserting and removing as in a portable power supply terminal are used, there is a problem that cracks and breaks are likely to occur.

On the other hand, in manufacturing parts assumed to be deformed, resins such as heat resistant polyamide which is resistant to deformation, has sufficient strength and heat resistance are used (for example, see Patent Literature 2 below).

CITATION LIST

Patent Literature

[Patent Literature 1] Japanese Unexamined Patent Application Publication No. 10-219085
[Patent Literature 2] Japanese Unexamined Patent Application Publication No. 07-228690

SUMMARY OF INVENTION

Technical Problem

However, in the recent trend of making terminal parts light, thin, short and small, parts such as an external connector or the like are also required to form thin-wall. In this case, in addition to the heat resistance or the deformation resistance, a resin having excellent thin-wall moldability is required. However, since the above-described heat resistant polyamide has low fluidity, the polyamide is not suitable for thin-wall molding. The wholly aromatic liquid crystal polyester has low flexibility and toughness as described above.

The present invention has been made in consideration of the above, and an object of the present invention is to provide a liquid crystal polyester amide which has excellent fluidity, and can form a molded article which has sufficient heat resistance, toughness, and strength, and is resistant to deformation, a liquid crystal polyester amide resin composition, and a molded article.

Solution to Problem

The present inventors have made extensive studies in order to solve the problems, and as a result, the inventors have found that the liquid crystal polyester amide obtained by copolymerizing p-hydroxybenzoic acid (HBA), acetaminophen (AAP), 1,4-cyclohexane dicarboxylic acid (CHDA), a specific aromatic diol, and a specific aromatic dicarboxylic acid at a specific ratio exhibits a high melting point and excellent fluidity, and is possible to form a molded article having a sufficient load deflection temperature, tensile strength, bending strength, tensile elongation, and Izod impact strength, and completed the present invention.

The present invention provides a liquid crystal polyester amide which includes 10 mol % to 65 mol % of a structural unit represented by the following formula (1), 3 mol % to 17.5 mol % of a structural unit represented by the following formula (2), 5 mol % to 20 mol % of a structural unit represented by the following formula (3), 7.5 mol % to 42 mol % in total of at least one of a structural unit represented by the following formula (4-1) and a structural unit represented by the following formula (4-2), and 2.5 mol % to 40 mol % in total of at least one of a structural unit represented by the following formula (5-1) and a structural unit represented by the following formula (5-2), and has a melting point of 300° C. or higher.

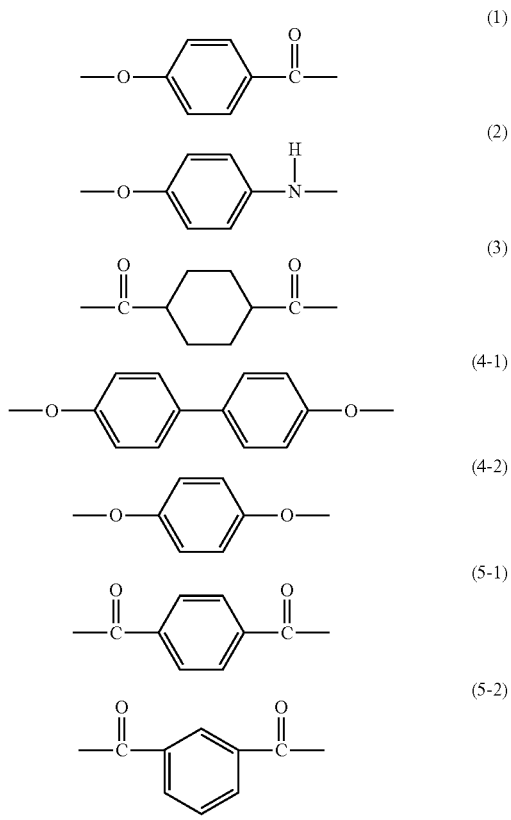

According to the liquid crystal polyester amide of the present invention, the liquid crystal polyester amide has excellent fluidity, and it is possible to form a molded article which has sufficient heat resistance, toughness, and strength, and is resistant to deformation. Thus, it is possible to achieve both thin-wall molding and sufficient durability in parts such as an external connector or the like.

The present invention also provides a liquid crystal polyester amide resin composition including the above-described liquid crystal polyester amide and an inorganic filler, in which a content of the inorganic filler is 5 parts by mass to 250 parts by mass with respect to 100 parts by mass of the liquid crystal polyester amide.

According to the liquid crystal polyester amide resin composition of the present invention, it is possible to form a molded article which has sufficient heat resistance, toughness, and strength, is resistant to deformation, and it is also possible to decrease wall thickness of the molded article.

The present invention also provides a molded article formed of the above described liquid crystal polyester amide resin composition of the present invention. The molded article of the present invention is formed of the liquid crystal polyester amide resin composition of the present invention, and thus the molded article has sufficient heat resistance, toughness, and strength, and is resistant to deformation. In addition, the molded article of the present invention can be decreased in wall thickness.

The present invention also provides an injection-molded article formed of the above described liquid crystal polyester amide resin composition of the present invention, and including a thin-wall portion having a thickness of 0.05 mm to 0.5 mm. The injection-molded article of the present invention formed of the liquid crystal polyester amide resin composition of the present invention, and thus is to be a molded article having both the toughness and the strength while including a thin-wall portion having a thickness of 0.05 mm to 0.5 mm.

Advantageous Effects of Invention

According to the present invention, it is possible to provide a liquid crystal polyester amide which has excellent fluidity, and can form a molded article which has excellent fluidity, sufficient heat resistance, toughness, and strength, and is resistant to deformation, and a liquid crystal polyester amide resin composition, and a molded article. According to the present invention, in particular, in a case of injection-molding a member including a thin-wall portion having a thickness of 0.05 mm to 0.5 mm, it is possible to obtain a molded article having both the excellent toughness and the strength under deformation. By using this effect, it is possible to obtain an injection-molded article which has recently increased in demand, and used in a portable terminal connector or the like having both the toughness and the strength while being thin-wall.

DESCRIPTION OF EMBODIMENTS

Figure 1:
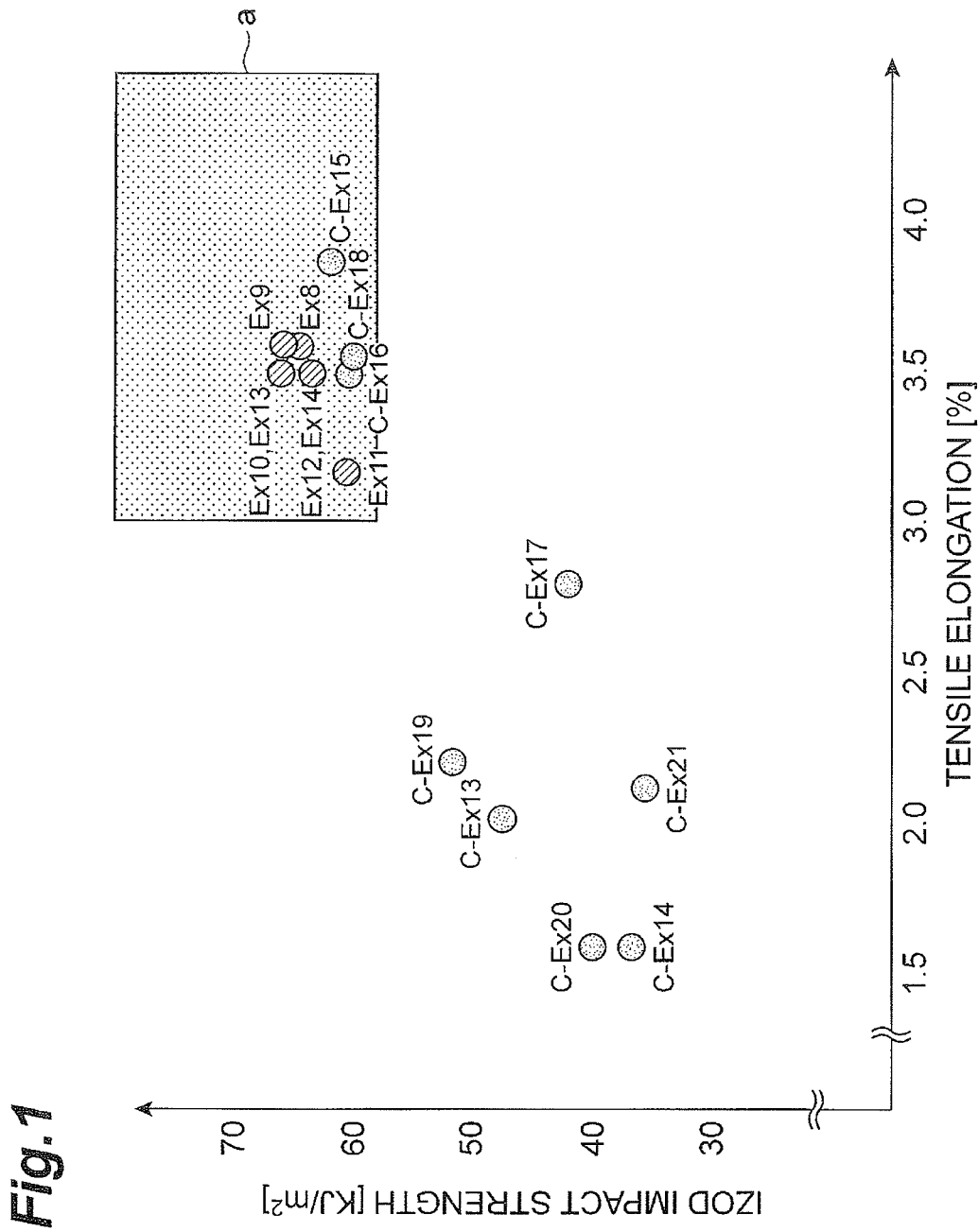
FIG. 1 is a graph showing a relationship between Izod impact strength and tensile elongation of molded articles obtained in Examples and Comparative Examples.

Liquid crystal polyester amide of the present embodiment includes, as essential structural units, 10 mol % to 65 mol % of a structural unit represented by the following formula (1), 3 mol % to 17.5 mol % of a structural unit represented by the following formula (2), 5 mol % to 20 mol % of a structural unit represented by the following formula (3), 7.5 mol % to 42 mol % in total of at least one of a structural unit represented by the following formula (4-1) and a structural unit represented by the following formula (4-2), and 2.5 mol % to 40 mol % in total of at least one of a structural unit represented by the following formula (5-1) and a structural unit represented by the following formula (5-2), and has a melting point of 300° C. or higher.

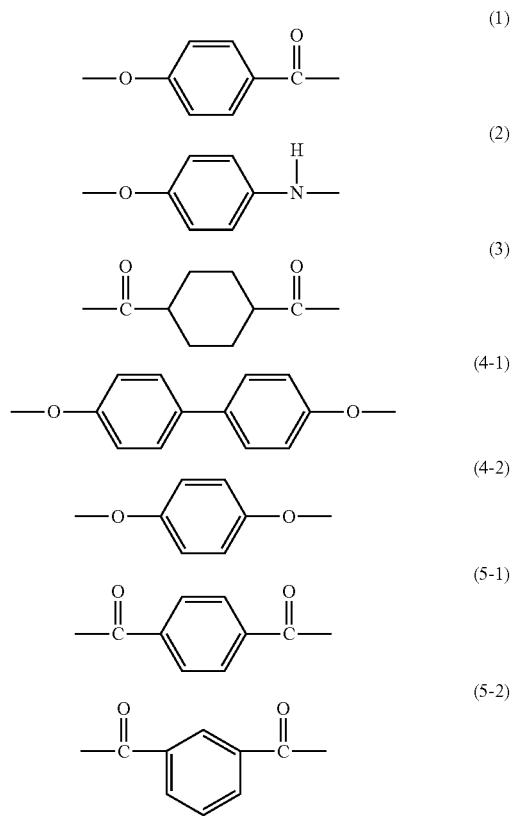

According to the liquid crystal polyester amide of the present embodiment, the liquid crystal polyester amide has excellent fluidity, and it is possible to form a molded article which has sufficient heat resistance, toughness and strength, and is resistant to deformation.

When a ratio of the structural unit represented by the formula (1) is less than 10 mol %, polyester amide is not uniformly crystallized in a molten state, and when a ratio is greater than 65 mol %, physical properties such as Izod impact strength is reduced. When a ratio of the structural unit represented by the formula (2) is less than 3 mol %, sufficient strength is not obtained, and when the ratio is greater than 17.5 mol %, polyester amide is not uniformly crystallized in the molten state. When a ratio of the structural unit represented by the formula (3) is less than 5 mol %, sufficient toughness is not obtained, and when the ratio is greater than 20 mol %, the heat resistance is not sufficient, and thus preparation is difficult.

When a total ratio of at least one of a structural unit represented by the formula (4-1) and a structural unit represented by the formula (4-2) is less than 7.5 mol %, the structural unit represented by the formula (2) is relatively great, and therefore a uniform crystal is not formed in the molten state, and when the ratio is greater than 42 mol %, the structural unit represented by the formula (2) is relatively small, and therefore sufficient strength is not obtained.

When a total ratio of at least one of a structural unit represented by the formula (5-1) and a structural unit represented by the formula (5-2) is less than 2.5 mol %, the structural unit represented by the formula (3) is relatively great, and therefore the heat resistance is not sufficient, and preparation is not easy, and when the ratio is greater than 40 mol %, the structural unit represented by the formula (3) is relatively small, and therefore sufficient toughness is not obtained.

The liquid crystal polyester amide of the present embodiment preferably has the structure in which a total mol % of the structural unit represented by the above-described formula (1), the structural unit represented by the above-described formula (2), the structural unit represented by the above-described formula (3), the structural unit represented by the above-described formula (4-1) and the structural unit represented by the above-described formula (4-2), and the structural unit represented by the above-describe formula (5-1) and the structural unit represented by the above-described formula (5-2) is within 100 mol %. In this case, a total mol % of the structural unit represented by the above-described formula (2), and the structural unit represented by the above-described formula (4-1) and the structural unit represented by the above-described formula (4-2) and a total mol % of the structural unit represented by the above-described formula (3), and the structural unit represented by the above-described formula (5-1) and the structural unit represented by the above-described formula (5-2) are set to be equal with each other.

The liquid crystal polyester amide of the present embodiment preferably includes 99.5 mol % or greater, more preferably 99.9 mol % or greater, and most preferably 100 mol % in sum of the above-described essential structural units.

In addition, in the present embodiment, from the viewpoint of the heat resistance and the strength, a content ratio of a structural unit derived from hydroxy carboxylic acid compound other than the structural unit represented by the formula (1) is preferably 0.5 mol % or less, and more preferably 0 mol %. In particular, from the viewpoint of the heat resistance, a structural unit derived from hydroxy carboxylic acid compound having a naphthalene ring is preferably 0.5 mol % or less, and is most preferably not contained.

In the present embodiment, from the viewpoint of a crystallinity and the Izod impact strength, a content of the structural unit represented by the above-described formula (1) in liquid crystal polyester amide is preferably 15 mol % to 65 mol %, and more preferably 20 mol % to 60 mol %.

In addition, from the viewpoint of the strength and ease of preparing, a content of the structural unit represented by the above-described formula (2) in liquid crystal polyester amide is preferably 4 mol % to 12 mol %, and more preferably 5 mol % to 8 mol %.

In addition, from the viewpoint of flexibility, the toughness, and the heat resistance, a content of the structural unit represented by the above-described formula (3) in liquid crystal polyester amide is preferably 7 mol % to 18 mol %, and more preferably 10 mol % to 15 mol %.

In addition, from the viewpoint of the strength and ease of preparing, a total content of at least one of the structural unit represented by the formula (4-1) and the structural unit represented by the formula (4-2) in liquid crystal polyester amide is preferably 9 mol % to 40 mol %, and more preferably 12 mol % to 35 mol %. Furthermore, from the viewpoint of the heat resistance and the Izod impact strength, a content of the structural unit represented by the formula (4-1) in liquid crystal polyester amide is preferably 5 mol % to 20 mol %, and more preferably 7.5 mol % to 15 mol %.

In addition, from the viewpoint of the flexibility, the toughness, and the heat resistance, a total content of at least one of the structural unit represented by the formula (5-1) and the structural unit represented by the formula (5-2) in liquid crystal polyester amide is preferably 2.5 mol % to 35 mol %, and more preferably 5 mol % to 30 mol %. Furthermore, from the viewpoint of the heat resistance and ease of preparing, a content of the structural unit represented by the formula (5-2) in liquid crystal polyester amide is preferably 1 mol % to 14 mol %, and more preferably 3 mol % to 10 mol %.

From the viewpoint of solder heat resistance, the melting point of the liquid crystal polyester amide in the present embodiment 300° C. or higher, from the viewpoint of the sufficient heat resistance and ease of preparing, the melting point is preferably 310° C. to 400° C., and more preferably 320° C. to 380° C.

The melting point of liquid crystal polyester amide can be measured by a differential scanning calorimeter (DSC) manufactured by SEIKO Electronics Industrial Co., Ltd. using α-alumina as a reference. After the polymer is completely melted by being heated from room temperature to 400° C. at a temperature raising rate of 20° C./min, the temperature was lowered to 80° C. at a rate of 10° C./min, and raised again to 420° C. at a rate of 20° C./min. An apex of the endothermic peak obtained at this time is taken as the melting point.

For example, the liquid crystal polyester amide according to the present embodiment can be obtained by copolymerization of p-hydroxybenzoic acid, acetaminophen, 1,4-cyclohexane dicarboxylic acid, 4,4'-dihydroxybiphenyl and/or hydroquinone, and terephthalic acid and/or isophthalic acid. In the obtained liquid crystal polyester amide, the structural unit represented by the above-described formula (1) is introduced from p-hydroxybenzoic acid, the structural unit represented by the above-described formula (2) is introduced from acetaminophen, the structural unit represented by the above-described formula (3) is introduced from 1,4-cyclohexane dicarboxylic acid, the structural unit represented by the above-described formula (4-1) is introduced from 4,4'-dihydroxybiphenyl, the structural unit represented by the above-described formula (4-2) is introduced from hydroquinone, the structural unit represented by the above-described formula (5-1) is introduced from terephthalic acid, and the structural unit represented by the above-described formula (5-2) is introduced from isophthalic acid. Each monomer ratio at this time is set such that each mol % of the structural unit represented by the above-described formula (1), the structural unit represented by the above-described formula (2), the structural unit represented by the above-described formula (3), the structural unit represented by the above-described formula (4-1) and/or the structural unit represented by the above-described formula (4-2), and the structural unit represented by the above-described formula (5-1) and/or the structural unit represented by the above-described formula (5-2) in the liquid crystal polyester amide is within the above-described range.

In the present embodiment, instead of the acetaminophen, other compounds which provide the structural unit represented by the formula (2) such as p-aminophenol, 4'-acetoxy acetanilide, or the like can be used.

In the liquid crystal polyester amide of the present embodiment, within a range not impairing the object of the present invention, copolymerizable monomers other than the compounds which provide structural units represented by the above-described formulas (1) to (3), (4-1), (4-2), (5-1), and (5-2) can be copolymerized and used. Examples of such monomers are as follows. As the dihydroxy compound, bisphenol A, bisphenol S, 4,4'-dihydroxy benzophenone, t-butyl hydroquinone, 3,3',5,5'-tetramethyl-4,4'-dihydroxy diphenyl, phenyl hydroquinone, and 4,4'-dihydroxy diphenyl ether can be exemplified. In addition, as the amine compound, 1,4-phenylenediamine, 1,3-phenylenediamine, 1,6-hexamethylenediamine, 1,4-butanediamine, and piperazine can be exemplified. In addition, as the dicarboxylic acid compound, benzophenone-4,4'-dicarboxylic acid, 4,4'-biphenyl dicarboxylic acid, 4,4'-diphenyl ether dicarboxylic acid, and adipic acid can be exemplified.

As a preparation method of the liquid crystal polyester amide according to the present embodiment, a method of performing melt polycondensation in which each compound described above is mixed at the ratio in which the monomer composition in the liquid crystal polyester amide is in the above-described range can be exemplified.

When liquid crystal polyester amides are prepared, it is preferable that the melt polycondensation be carried out by using the monomer in which an amino group or a hydroxyl group is acetylated such as acetaminophen, or be carried out after the hydroxyl group or the amino group of the above-described monomer is acetylated in advance to shorten the melt polycondensation time and thus reduce influence of a thermal history during the process. In a case of acetylating in advance, the acetylation is preferably carried out by supplying acetic anhydride to the monomer in a reaction vessel, and the acetylation process is preferably carried out using the reaction vessel as the same as that in the melt polycondensation process to simplify the process. That is, it is preferable that the acetylation reaction of the raw material monomers with acetic anhydride in the reaction vessel be carried out, and after the reaction ends, the temperature be raised to transit to the polycondensation reaction. In addition, acetic anhydride is preferably supplied such that the excessive amount of acetic anhydride is 1 mol % to 10 mol % with respect to the total number of moles of a hydroxyl group and an amino group of the monomer. When the excessive amount of acetic anhydride is less than 1 mol %, the reaction rate is decreased, and liquid crystal polyester amide tends to be colored, and when the excessive amount is greater than 10 mol %, liquid crystal polyester amide tends to be colored by the influence of the remaining acetic anhydride.

The melt polycondensation reaction of the acetylated monomer can be performed while accompanying a deacetic acid reaction. As the reaction vessel, a reaction vessel equipped with monomer supplying means, acetic acid discharging means, molten polyester amide withdrawal means, and stirring means is preferably used. Such a reaction vessel (polycondensation apparatus) can be appropriately selected from known reaction vessels. The polymerization temperature is preferably 150° C. to 350° C. It is preferable that after the acetylation reaction ends, the temperature be raised to a polymerization initiating temperature to initiate the polycondensation, raised in a range of 0.1° C./min to 5° C./min, and raised to 280° C. to 350° C. as a final temperature. In this manner, the polycondensation temperature also is preferably increased in response to the increase of the melting temperature of the product polymer with the progress of the polycondensation. In the polycondensation reaction, as a polycondensation catalyst of polyester, known catalysts can be used. As the catalyst, metal catalysts such as magnesium acetate, tin (II) acetate, tetrabutyl titanate, lead acetate, sodium acetate, potassium acetate, and the like, and organic compounds catalysts such as N-methyl imidazole, and the like can be exemplified.

In the melt polycondensation, when the temperature of the molten polymer in the reaction vessel reaches 200° C. or higher, preferably 220° C. to 330° C., liquid crystal polyester amide with a low degree of polymerization is withdrawn from the polymerization vessel in the molten state, is supplied to the cooler such as a steel belt or a drum cooler, and is solidified by cooling.

Next, the solidified liquid crystal polyester amide with a low degree of polymerization is pulverized to a size which is suitable for the following solid phase polycondensation reaction. The pulverization method is not particularly limited, and for example, methods using impact-pulverizers such as Feather Mill, Victor Mill, Coroflex, Pulverizer, Contraplex, Scroll mill, and ACM pulverizer manufactured by Hosokawa Micron Group, and apparatus such as a roll granulator which is a rack-grind type pulverizer manufactured by MATSUBO are preferably exemplified. A method using the Feather Mill manufactured by Hosokawa Micron Group is particularly preferable. In the present invention, a particle diameter of a pulverized material is not particularly limited, and the range is preferably 4-mesh passing to 2000-mesh interruption in an industrial sieve (Tyler mesh), more preferably 5 mesh to 2000 mesh (0.01 mm to 4 mm), and most preferably 9 mesh to 1450 mesh (0.02 to 2 mm).

Then, the pulverized material (prepolymer) obtained in the pulverizing process is supplied to the solid phase polycondensation process to be subjected to the solid phase polycondensation. The apparatus used in the solid phase polycondensation process and operation conditions are not particularly limited, and known apparatus and methods can be used.

It is preferable that, from the viewpoint of obtaining the liquid crystal polyester amide which is slightly colored, the liquid crystal polyester amide according to the present embodiment be obtained by a two-step polymerization of the melt polycondensation and the solid phase polycondensation.

In the present embodiment, the melt polycondensation temperature is preferably set to 320° C. or lower, more preferably set to 315° C. or lower, and further more preferably set to 290° C. to 310° C. When this temperature is lower than 290° C., there is a tendency that the prepolymer with a sufficient degree of polymerization is not obtained, and when this temperature is higher than 315° C., there is a tendency that coloration easily occurs. Moreover, the melt polycondensation temperature described above is a temperature of the molten polymer which can be detected by a thermocouple installed in the reaction vessel.

The melt polycondensation temperature is preferably raised in a range of a temperature raising rate of 0.1° C./min to 5.0° C./min, more preferably raised in a range of a temperature raising rate of 0.3° C./min to 3.0° C./min. When the temperature raising rate is 0.1° C./min or less, production efficiency is significantly reduced, and when the temperature raising rate is 5.0° C./min or greater, there is a possibility that unreacted components are increased, and coloration in the solid phase polycondensation is caused.

In the present embodiment, after the acetylation reaction ends, the temperature is raised to initiate the polycondensation, raised in a range of 0.1° C./min to 2° C./min, preferably raised to 290° C. to 320° C. as a final reaching temperature, and more preferably raised to 300° C. to 310° C.

In addition, the solid phase polycondensation temperature is preferably set to 330° C. or lower, more preferably set to 325° C. or lower, and further more preferably set to 290° C. to 320° C. When this temperature is lower than 290° C., there is a tendency that the liquid crystal polyester amide with a sufficient degree of polymerization is unlikely to be obtained, and when this temperature is higher than 320° C., there is a tendency that coloration easily occurs. Moreover, the solid phase polycondensation temperature described above is a temperature of the polymer powder which can be detected by a thermocouple installed in the reaction vessel.

In this manner, the liquid crystal polyester amide according to the present embodiment can be obtained.

The liquid crystal polyester amide according to the present embodiment is a thermotropic liquid crystal which exhibits a crystallinity (optical anisotropy) in a molten state, and it can be confirmed in the following order. Using a polarization microscope BH-2 manufactured by Olympus Corporation equipped with a microscope cooling and heating stage 10002 type for a microscope manufactured by Japan High Tech Co., Ltd., a polyester amide sample is heated to melt on the microscope heating stage. Then, the presence or absence of the optical anisotropy can be confirmed by observing at 100 times and 200 times magnification at the time of melting.

Next, the liquid crystal polyester amide resin composition of the present invention will be described.

The liquid crystal polyester amide resin composition of the present embodiment includes the liquid crystal polyester amide according to the present embodiment described above and an inorganic filler, and a content of the inorganic filler in the resin composition is 5 parts by mass to 250 parts by mass with respect to 100 parts by mass of the liquid crystal polyester amide.

When the content of the inorganic filler is less than 5 parts by mass, the anisotropy of the molded article is strong, and practical molded article is unlikely to be obtained, and when the content is greater than 250 parts by mass, sufficient strength and the toughness are unlikely to be obtained. From the viewpoint of the balance of moldability, the strength, and the toughness, the content of the inorganic filler is preferably 15 parts by mass to 250 parts by mass, more preferably 30 parts by mass to 120 parts by mass, and further more preferably 40 parts by mass to 80 parts by mass with respect to 100 parts by mass of the liquid crystal polyester amide.

As the inorganic filler, glass fiber, alumina fiber, carbon fiber, wollastonite, titanium oxide, barium sulfate, zinc oxide, magnesium oxide, magnesium carbonate, barium titanate, silica, talc, mica, carbon black, and a glass balloon can be exemplified.

In the present embodiment, from the viewpoint of obtaining sufficient strength, fibrous inorganic fillers such as glass fiber, alumina fiber, carbon fiber, and wollastonite are preferably included, and from the viewpoint of availability and cost, glass fiber is more preferably included. The resin composition in this case preferably contains 5 parts by mass to 85 parts by mass of the fibrous inorganic filler with respect to 100 parts by mass of the liquid crystal polyester amide.

As the glass fiber, materials used as general resin reinforcing materials such as chopped strand, milled fiber, and the like can be preferably used, and among these, the chopped strand is preferable. A fiber length of the glass fiber used is 100 μm to 10 mm in a number average length, preferably 200 μm to 5 mm, and more preferably 200 μm to 3 mm. A thickness of the glass fiber is preferably 5 μm to 20 μm in a number average diameter from the viewpoint of the fluidity at the time of injection molding, and more preferably 7 μm to 15 μm in the number average diameter. As a preferable specific example of the glass fiber, "PX-1" (the number average fiber diameter is 10 μm, the number average fiber length is 3 mm) manufactured by Owens Corning Japan LLC., and the like can be exemplified.

The content of the liquid crystal polyester amide according to the present embodiment in the liquid crystal polyester amide resin composition of the present embodiment is preferably 50% by mass to 85% by mass, and more preferably 55% by mass to 75% by mass based on the total amount of the resin composition.

In the liquid crystal polyester amide resin composition of the present embodiment, it is possible to blend one or two or more kinds of various additives within a range not impairing the object of the present invention. As the additives, for example, general additives such as an antioxidant and a thermal stabilizer (for example, hindered phenol, hydroquinone, phosphites, and substituents thereof), an ultraviolet absorber (for example, resorcinol, salicylate, benzotriazole, and benzophenone), a lubricant and a release agent (for example, montanic acid and salts thereof, esters thereof, half esters thereof, stearyl alcohol, stearamide, and polyethylene wax), a flame retardant (for example, halogen-based compounds, phosphate ester-based compounds, condensed phosphate ester-based compounds, red phosphorus-based compounds, and silicone-based compounds), a plasticizer, and an antistatic agent, and other thermoplastic resins can be exemplified. It is possible to impart desired properties to the resin composition by adding these additives.

From the viewpoint of the solder heat resistance, in the liquid crystal polyester amide resin composition of the present embodiment, a load deflection temperature (DTUL) of a molded article is preferably 240° C. or higher, more preferably 250° C. or higher, and further more preferably 260° C. or higher. When DTUL is lower than 240° C., in particular, the solder heat resistance of a thin-wall molded article (parts or the like) is not sufficient. Moreover, DTUL of a molded article is a value measured according to ASTM D648 using a test piece for the bending test manufactured based on ASTM D790.

From the viewpoint of the flexibility and the toughness of a molded article, in the liquid crystal polyester amide resin composition of the present embodiment, the Izod impact strength of a molded article is preferably 60 kJ/m$^2$ or greater, more preferably 63 kJ/m$^2$ or greater, and further more preferably 65 kJ/m$^2$ or greater. When the Izod impact strength is less than 60 Id/m$^2$, the flexibility and the toughness are not sufficient, and in particular, in a case of a thin-wall molded article (parts or the like) such as a connector, there is a tendency that during repeating insertion and removal, a problem of brittleness such as generation of cracks occurs. The Izod impact strength (no notch) of a molded article is a value measured according to ASTM D256 using the test piece for the bending test manufactured based on ASTM D790.

From the viewpoint of the flexibility and the toughness of a molded article, in the liquid crystal polyester amide resin composition of the present embodiment, tensile elongation of a molded article is preferably 3.0% or greater, more preferably 3.3% or greater, and further more preferably 3.5% or greater. When the tensile elongation is less than 3.0%, the flexibility and the toughness are not sufficient, and in particular, in a case of a thin-wall molded article (parts or the like) such as a connector, there is a tendency that during repeating insertion and removal, a problem of durability such as generation of cracks occurs. The tensile elongation of a molded article is a value measured according to ASTM D638 using a test piece for the tensile test manufactured based on ASTM D638.

From the viewpoint of the strength of a molded article, in the liquid crystal polyester amide resin composition of the present embodiment, a tensile strength of a molded article is preferably 110 MPa or greater, more preferably 120 MPa or greater, and further more preferably 125 MPa or greater. When the tensile strength is lower than 110 MPa, in particular, the strength of a thin-wall molded article (parts or the like) is not sufficient. The tensile strength of a molded article is a value measured according to ASTM D638 using a test piece for the tensile test manufactured based on ASTM D638.

From the viewpoint of the flexibility and the toughness of a molded article, in the liquid crystal polyester amide resin composition of the present embodiment, a tensile modulus of a molded article is preferably 15000 MPa or less, more preferably 14000 MPa or less, and further more preferably 13000 MPa or less. When the tensile modulus is greater than 15000 MPa, in particular, the flexibility and the toughness of a thin-wall molded article (parts or the like) are not sufficient, and there is a tendency that the molded article is brittle with respect to deformation by an external force. The elastic modulus of a molded article is a value measured according to ASTM D638 using a test piece for the tensile test manufactured based on ASTM D638.

From the viewpoint of the flexibility and the toughness of a molded article, in the liquid crystal polyester amide resin composition of the present embodiment, a bending modulus of a molded article is preferably 13000 MPa or less, more preferably 12000 MPa or less, and further more preferably 11500 MPa or less. When the bending modulus is greater than 13000 MPa, in particular, the flexibility and the toughness of a thin-wall molded article (parts or the like) are not sufficient, and there is a tendency that the molded article is brittle with respect to deformation by an external force. The bending modulus of a molded article is a value measured according to ASTM D790 using a test piece for the bending test manufactured based on ASTM D790.

From the viewpoint of the strength of a molded article, in the liquid crystal polyester amide resin composition of the present embodiment, a bending strength of a molded article is preferably 140 MPa or greater, more preferably 150 MPa or greater, and further more preferably 155 MPa or greater. The bending strength of a molded article is a value measured according to ASTM D790 using a test piece for the bending test manufactured based on ASTM D790.

According to the liquid crystalline polyester amide resin composition of the present embodiment, it is possible to make all of the Izod impact strength, the tensile elongation, and the tensile strength of a molded article to be the above-described appropriate level or higher by containing the liquid crystalline polyester amide of the present embodiment. According to such liquid crystal polyester resin composition, it is possible to form a molded article which has sufficient heat resistance, toughness and strength, and is resistant to deformation, and it is also possible to decrease wall thickness of the molded article.

The liquid crystal polyester amide resin composition of the present embodiment can be obtained by melting and kneading each component described above (liquid crystalline polyester amide, inorganic filler, and if necessary, other additives). As the apparatus for melting and kneading, a twin screw kneader can be used. Continuous extrusion type twin-screw kneaders with one pair of two screws are more preferable, and among these, a same direction rotary type in which the filler can be uniformly dispersed by a crosscut mechanism is preferable. When using a kneader which has void between barrel screws into which the filler is easily fed, a cylinder diameter of 40 mmφ or greater, a large engaging ratio of 1.45 or greater between screws, and to which the filler can be supplied from the middle of the cylinder, it is possible to efficiently obtain the resin composition of the present embodiment. In addition, in a case of blending the fibrous inorganic filler such as glass fiber, it is also possible to use an apparatus having equipment for supplying at least a portion of the fibrous inorganic filler to the middle of the cylinder.

The liquid crystal polyester amide and the inorganic filler are mixed using known solid mixing equipment, for example, a ribbon blender, a tumbler blender, or a Henschel mixer, or the like, and if necessary, the mixture is dried by a hot air dryer or a reduced-pressure dryer, is preferably supplied from a hopper of the twin-screw kneader.

In the preparation of the resin composition containing the fibrous inorganic filler such as glass fiber, it is also possible to supply (so-called side feed) at least a portion of the glass fiber to be blended from the middle of the cylinder of the twin-screw kneader. Thus, as compared with a case of supplying (so-called top feed) all glass fiber from the hopper together with other raw material, there is a tendency that mechanical strength of the weld portion of a molded article formed by injection-molding the obtained resin composition is further improved. A ratio to be side fed in the total amount of glass fiber to be blended is preferably 50% or more, and most preferably 100%. When the ratio to be side fed is less than the above-described lower limit, compounding (blending and mixing) is difficult, and there is a tendency that it is not possible to obtain a homogeneous resin composition.

The liquid crystal polyester amide resin composition of the present embodiment can be appropriately used as a resin composition for molding surface mounting parts such as a connector of a mobile terminal.

Next, the molded article of the present invention will be described. The molded article of the present embodiment is formed by molding the liquid crystal polyester resin composition according to the present embodiment described above. As the molding method, an injection molding, a extrusion molding, and a press molding can be exemplified, and from the viewpoint of ease of molding, mass production, and cost, the injection molding using an injection molding machine is preferable.

The molded article of the present embodiment formed by molding the liquid crystal polyester amide resin composition of the present embodiment can satisfy the load deflection temperature (DTUL), the Izod impact strength, the tensile elongation, and the tensile strength, the tensile modulus, the bending modulus, or the bending strength described above.

In a case of applications in which the heat resistance, the toughness, the strength, and the durability against deformation are required, all of the Izod impact strength, the tensile elongation, and the tensile strength of the molded article of the present embodiment are preferably the above-described appropriate level or higher.

EXAMPLES

Hereinafter, the present invention will be specifically described by Examples, and the present invention is not limited to the following Examples.

<Preparation of Polyester Amide and Polyester>

First, preparation examples of polymer are shown below. In addition, a monomer composition (mol %) and a melting point of each polymer prepared are shown in Tables 1 and 2.

Example 1

Preparation of Liquid Crystal Polyester Amide (A)

1325.95 g (9.6 mol) of p-hydroxybenzoic acid (manufactured by Ueno Fine Chemicals Industry Co., Ltd.), 120.94 g (0.80 mol) of acetaminophen (manufactured by Mallinckrodt Pharmaceuticals), 446.90 g (2.40 mol) of 4,4'-dihydroxybiphenyl (manufactured by Honshu Chemical Industry Co., Ltd.), 275.49 g (1.60 mol) of 1,4-cyclohexane dicarboxylic acid (manufactured by Eastman Chemical Company), 186.07 g (1.12 mol) of terephthalic acid (manufactured by Mitsui Chemicals, Inc.), and 79.74 g (0.48 mol) of isophthalic acid (manufactured by AG International Chemical Co., Inc.), and as a catalyst, 0.16 g of potassium acetate (Kishida Chemical Co., Ltd.) and 0.48 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1629.36 g (15.96 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

After the acetylation ended, the temperature of the polymerization tank in acetic acid distillation state was raised at a rate of 0.5° C./min. When the reactor temperature reached 305° C., a polymer was taken out from a discharging port of the reactor bottom, and was cooled and solidified. By a pulverizer manufactured by Hosokawa Micron Group, the obtained polymer was pulverized to a size which is possible to pass through a sieve of 2.0 mm mesh, thereby obtaining a prepolymer.

Next, 1000 g of the prepolymer obtained above was filled in the solid phase polymerization apparatus manufactured by IRIE SHOKAI Co., Ltd., and while nitrogen was flowed at a flow velocity 0.1 Nm³/hr, a heater temperature was raised from room temperature to 150° C. over 45 minutes at a rotational speed of 5 rpm, raised to 250° C. over 4 hours, further raised to 300° C. over 3 hours, and maintained at 300° C. for 1 hour. Next a solid phase polycondensation was carried out. In this manner, 970 g of powdered thermotropic liquid crystal polyester amide (A) was obtained. The melting point of the obtained thermotropic liquid crystal polyester amide (A) was 325° C.

Example 2

Preparation of Liquid Crystal Polyester Amide (B)

1325.95 g (9.60 mol) of p-hydroxybenzoic acid (manufactured by Ueno Fine Chemicals Industry Co., Ltd.), 193.50 g (1.28 mol) of acetaminophen (manufactured by Mallinckrodt Pharmaceuticals), 357.52 g (1.92 mol) of 4,4'-dihydroxybiphenyl (manufactured by Honshu Chemical Industry Co., Ltd.), 275.49 g (1.60 mol) of 1,4-cyclohexane dicarboxylic acid (manufactured by Eastman Chemical Company), 132.90 g (0.80 mol) of terephthalic acid (manufactured by Mitsui Chemicals, Inc.), and 132.90 g (0.80 mol) of isophthalic acid (manufactured by AG International Chemical Co., Inc.), and as a catalyst, 0.16 g of potassium acetate (Kishida Chemical Co., Ltd.) and 0.48 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1577.90 g (15.46 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 300° C.), the solid phase polymerization (the end temperature was 300° C.) was performed, thereby obtaining thermotropic liquid crystal polyester amide (B). The melting point of the obtained thermotropic liquid crystal polyester amide was 335° C.

Example 3

Preparation of Liquid Crystal Polyester Amide (C)

441.98 g (3.20 mol) of p-hydroxybenzoic acid (manufactured by Ueno Fine Chemicals Industry Co., Ltd.), 193.50 g (1.28 mol) of acetaminophen (manufactured by Mallinckrodt Pharmaceuticals), 297.94 g (1.60 mol) of 4,4'-dihydroxybiphenyl (manufactured by Honshu Chemical Industry Co., Ltd.), 387.59 g (3.52 mol) of hydroquinone (manufactured by Ube Industries, Ltd.), 275.49 g (1.60 mol) of 1,4-cyclohexane dicarboxylic acid (manufactured by Eastman Chemical Company), 584.78 g (3.52 mol) of terephthalic acid (manufactured by Mitsui Chemicals, Inc.), and 212.65 g (1.28 mol) of isophthalic acid (manufactured by AG International Chemical Co., Inc.), and as a catalyst, 0.32 g of potassium acetate (Kishida Chemical Co., Ltd.) and 0.96 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1622.99 g (15.90 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 310° C.), the solid phase polymerization (the end temperature was 320° C.) was performed, thereby obtaining thermotropic liquid crystal polyester amide (C). The melting point of the obtained thermotropic liquid crystal polyester amide was 360° C.

Example 4

Preparation of Liquid Crystal Polyester Amide (D)

1325.95 g (9.60 mol) of p-hydroxybenzoic acid (manufactured by Ueno Fine Chemicals Industry Co., Ltd.), 120.94 g (0.80 mol) of acetaminophen (manufactured by Mallinckrodt Pharmaceuticals), 446.90 g (2.40 mol) of 4,4'-dihydroxybiphenyl (manufactured by Honshu Chemical Industry Co., Ltd.), 137.74 g (0.80 mol) of 1,4-cyclohexane dicarboxylic acid (manufactured by Eastman Chemical Company), 265.81 g (1.60 mol) of terephthalic acid (manufactured by Mitsui Chemicals, Inc.), and 132.90 g (0.80 mol) of isophthalic acid (manufactured by AG International Chemical Co., Inc.), and as a catalyst, 0.16 g of potassium acetate (Kishida Chemical Co., Ltd.) and 0.32 g of magnesium acetate (Kishida Chemical Co., Ltd.) were put into a polymerization tank having an inner volume of 6 L with a double helical stirring blade (manufactured by Nitta high pressure, Co., Ltd.) made from SUS316, and after nitrogen substitution was carried out by performing reduction of pressure-nitrogen injection with respect to the polymerization tank 3 times, 1629.36 g (15.96 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 310° C.), the solid phase polymerization (the end temperature was 310° C.) was performed, thereby obtaining thermotropic liquid crystal polyester amide (D). The melting point of the obtained thermotropic liquid crystal polyester amide was 340° C.

Example 5

Preparation of Liquid Crystal Polyester Amide (E)

1436.45 g (10.40 mol) of p-hydroxybenzoic acid (manufactured by Ueno Fine Chemicals Industry Co., Ltd.), 120.94 g (0.80 mol) of acetaminophen (manufactured by Mallinckrodt Pharmaceuticals), 372.42 g (2.00 mol) of 4,4'-dihydroxybiphenyl (manufactured by Honshu Chemical Industry Co., Ltd.), 275.49 g (1.60 mol) of 1,4-cyclohexane dicarboxylic acid (manufactured by Eastman Chemical Company), 119.61 g (0.72 mol) of terephthalic acid (manufactured by Mitsui Chemicals, Inc.), and 79.74 g (0.48 mol) of isophthalic acid (manufactured by AG International Chemical Co., Inc.), and as a catalyst, 0.16 g of potassium acetate (Kishida Chemical Co., Ltd.) and 0.48 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1629.36 g (15.96 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 305° C.), the solid phase polymerization (the end temperature was 300° C.) was performed, thereby obtaining thermotropic liquid crystal polyester amide (E). The melting point of the obtained thermotropic liquid crystal polyester amide was 325° C.

Example 6

Preparation of Liquid Crystal Polyester Amide (F)

220.99 g (1.60 mol) of p-hydroxybenzoic acid (manufactured by Ueno Fine Chemicals Industry Co., Ltd.), 193.50 g (1.28 mol) of acetaminophen (manufactured by Mallinckrodt Pharmaceuticals), 297.94 g (1.60 mol) of 4,4'-dihydroxybiphenyl (manufactured by Honshu Chemical Industry Co., Ltd.), 475.68 g (4.32 mol) of hydroquinone (manufactured by Ube Industries, Ltd.), 275.49 g (1.60 mol) of 1,4-cyclohexane dicarboxylic acid (manufactured by Eastman Chemical Company), 664.52 g (4.00 mol) of terephthalic acid (manufactured by Mitsui Chemicals, Inc.), and 265.81 g (1.60 mol) of isophthalic acid (manufactured by AG International Chemical Co., Inc.), and as a catalyst, 0.32 g of potassium acetate (Kishida Chemical Co., Ltd.) and 0.96 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1622.99 g (15.90 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 310° C.), the solid phase polymerization (the end temperature was 320° C.) was performed, thereby obtaining thermotropic liquid crystal polyester amide (F). The melting point of the obtained thermotropic liquid crystal polyester amide was 350° C.

Example 7

Preparation of Liquid Crystal Polyester Amide (G)

1104.96 g (8.00 mol) of p-hydroxybenzoic acid (manufactured by Ueno Fine Chemicals Industry Co., Ltd.), 423.28 g (2.80 mol) of acetaminophen (manufactured by Mallinckrodt Pharmaceuticals), 223.45 g (1.20 mol) of 4,4'-dihydroxybiphenyl (manufactured by Honshu Chemical Industry Co., Ltd.), 550.98 g (3.20 mol) of 1,4-cyclohexane dicarboxylic acid (manufactured by Eastman Chemical Company), and 132.90 g (0.80 mol) of isophthalic acid (manufactured by AG International Chemical Co., Inc.), and as a catalyst, 0.16 g of potassium acetate (Kishida Chemical Co., Ltd.) and 0.32 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1414.97 g (13.86 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 290° C.), the solid phase polymerization (the end temperature was 295° C.) was performed, thereby obtaining thermotropic liquid crystal polyester amide (G). The melting point of the obtained thermotropic liquid crystal polyester amide was 350° C.

Comparative Example 1

Preparation of Liquid Crystal Polyester (H)

1325.95 g (9.60 mol) of p-hydroxybenzoic acid (manufactured by Ueno Fine Chemicals Industry Co., Ltd.), 595.87 g (3.20 mol) of 4,4'-dihydroxybiphenyl (manufactured by Honshu Chemical Industry Co., Ltd.), 398.71 g (2.40 mol) of terephthalic acid (manufactured by Mitsui Chemicals, Inc.), and 132.90 g (0.80 mol) of isophthalic acid (manufactured by AG International Chemical Co., Inc.), and as a catalyst, 0.16 g of potassium acetate (Kishida Chemical Co., Ltd.) and 0.48 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1715.11 g (16.80 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 310° C.), the solid phase polymerization (the end temperature was 320° C.) was performed, thereby obtaining thermotropic liquid crystal polyester (H). The melting point of the obtained thermotropic liquid crystal polyester was 355° C.

Comparative Example 2

Preparation of Liquid Crystal Polyester (I)

441.98 g (3.20 mol) of p-hydroxybenzoic acid (manufactured by Ueno Fine Chemicals Industry Co., Ltd.), 297.94 g (1.60 mol) of 4,4'-dihydroxybiphenyl (manufactured by Honshu Chemical Industry Co., Ltd.), 528.53 g (4.80 mol) of hydroquinone (manufactured by Ube Industries, Ltd.), 717.68 g (4.32 mol) of terephthalic acid (manufactured by Mitsui Chemicals, Inc.), and 345.55 g (2.08 mol) of isophthalic acid (manufactured by AG International Chemical Co., Inc.), and as a catalyst, 0.32 g of potassium acetate (Kishida Chemical Co., Ltd.) and 0.96 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1764.12 g (17.28 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 310° C.), the solid phase polymerization (the end temperature was 310° C.) was performed, thereby obtaining thermotropic liquid crystal polyester (I). The melting point of the obtained thermotropic liquid crystal polyester was 340° C.

Comparative Example 3

Preparation of Liquid Crystal Polyester (J)

1325.95 g (9.60 mol) of p-hydroxybenzoic acid (manufactured by Ueno Fine Chemicals Industry Co., Ltd.), 595.87 g (3.20 mol) of 4,4'-dihydroxybiphenyl (manufactured by Honshu Chemical Industry Co., Ltd.), and 550.98 g (3.20 mol) of 1,4-cyclohexane dicarboxylic acid (manufactured by Eastman Chemical Company), and as a catalyst, 0.16 g of potassium acetate (Kishida Chemical Co., Ltd.) and 0.48 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1715.11 g (16.80 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Preparation Example 1 (the reactor temperature when being taken out was 310° C.), the solid phase polymerization (the end temperature was 300° C.) was performed, thereby obtaining thermotropic liquid crystal polyester (J). The melting point of the obtained thermotropic liquid crystal polyester was 345° C.

Comparative Example 4

Preparation of Liquid Crystal Polyester (K)

1325.95 g (9.60 mol) of p-hydroxybenzoic acid (manufactured by Ueno Fine Chemicals Industry Co., Ltd.), 595.87 g (3.20 mol) of 4,4'-dihydroxybiphenyl (manufactured by Honshu Chemical Industry Co., Ltd.), 275.49 g (1.60 mol) of 1,4-cyclohexane dicarboxylic acid (manufactured by Eastman Chemical Company), 186.07 g (1.12 mol) of terephthalic acid (manufactured by Mitsui Chemicals, Inc.), and 79.74 g (0.48 mol) of isophthalic acid (manufactured by AG International Chemical Co., Inc.), and as a catalyst, 0.16 g of potassium acetate (Kishida Chemical Co., Ltd.) and 0.48 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1577.90 g (15.46 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 310° C.), the solid phase polymerization (the end temperature was 295° C.) was performed, thereby obtaining thermotropic liquid crystal polyester (K). The melting point of the obtained thermotropic liquid crystal polyester was 335° C.

Comparative Example 5

Preparation of Liquid Crystal Polyester (L)

441.98 g (3.20 mol) of p-hydroxybenzoic acid (manufactured by Ueno Fine Chemicals Industry Co., Ltd.), 1191.74 g (6.40 mol) of 4,4'-dihydroxybiphenyl (manufactured by Honshu Chemical Industry Co., Ltd.), 275.49 g (1.60 mol) of 1,4-cyclohexane dicarboxylic acid (manufactured by Eastman Chemical Company), 398.71 g (2.40 mol) of terephthalic acid (manufactured by Mitsui Chemicals, Inc.), and 398.71 g (2.40 mol) of isophthalic acid (manufactured by AG International Chemical Co., Inc.), and as a catalyst, 0.32 g of potassium acetate (Kishida Chemical Co., Ltd.) and 0.96 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1764.12 g (17.28 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 310° C.), the solid phase polymerization (the end temperature was 300° C.) was performed, thereby obtaining thermotropic liquid crystal polyester (L). The melting point of the obtained thermotropic liquid crystal polyester was 325° C.

Comparative Example 6

Preparation of Liquid Crystal Polyester Amide (M)

1325.95 g (9.60 mol) of p-hydroxybenzoic acid (manufactured by Ueno Fine Chemicals Industry Co., Ltd.), 48.37 g (0.32 mol) of acetaminophen (manufactured by Mallinckrodt Pharmaceuticals), 536.28 g (2.88 mol) of 4,4'-dihydroxybiphenyl (manufactured by Honshu Chemical Industry Co., Ltd.), 275.49 g (1.60 mol) of 1,4-cyclohexane dicarboxylic acid (manufactured by Eastman Chemical Company), 186.07 g (1.12 mol) of terephthalic acid (manufactured by Mitsui Chemicals, Inc.), and 79.74 g (0.48 mol) of isophthalic acid (manufactured by AG International Chemical Co., Inc.), and as a catalyst, 0.16 g of potassium acetate (Kishida Chemical Co., Ltd.) and 0.48 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1680.81 g (16.46 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 310° C.), the solid phase polymerization (the end temperature was 295° C.) was performed, thereby obtaining thermotropic liquid crystal polyester amide (M). The melting point of the obtained thermotropic liquid crystal polyester amide was 330° C.

Comparative Example 7

Preparation of Liquid Crystal Polyester Amide (N)

1325.95 g (9.60 mol) of p-hydroxybenzoic acid (manufactured by Ueno Fine Chemicals Industry Co., Ltd.), 120.94 g (0.80 mol) of acetaminophen (manufactured by Mallinckrodt Pharmaceuticals), 446.90 g (2.40 mol) of 4,4'-dihydroxybiphenyl (manufactured by Honshu Chemical Industry Co., Ltd.), 55.10 g (0.32 mol) of 1,4-cyclohexane dicarboxylic acid (manufactured by Eastman Chemical Company), 345.55 g (2.08 mol) of terephthalic acid (manufactured by Mitsui Chemicals, Inc.), and 132.90 g (0.80 mol) of isophthalic acid (manufactured by AG International Chemical Co., Inc.), and as a catalyst, 0.16 g of potassium acetate (Kishida Chemical Co., Ltd.) and 0.48 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1629.36 g (15.96 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 310° C.), the solid phase polymerization (the end temperature was 315° C.) was performed, thereby obtaining thermotropic liquid crystal polyester amide (N). The melting point of the obtained thermotropic liquid crystal polyester amide was 355° C.

Comparative Example 8

Preparation of Liquid Crystal Polyester Amide (O)

1325.95 g (9.60 mol) of p-hydroxybenzoic acid (manufactured by Ueno Fine Chemicals Industry Co., Ltd.), 241.87 g (1.60 mol) of acetaminophen (manufactured by Mallinckrodt Pharmaceuticals), 256.27 g (1.60 mol) of 2,6'-naphthalenediol (manufactured by Tokyo Chemical Industry Co., Ltd.), 275.49 g (1.60 mol) of 1,4-cyclohexane dicarboxylic acid (manufactured by Eastman Chemical Company), and 265.81 g (1.60 mol) of terephthalic acid (manufactured by Mitsui Chemicals, Inc.), and as a catalyst, 0.16 g of potassium acetate (Kishida Chemical Co., Ltd.) and 0.48 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1543.60 g (15.12 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 300° C.), the solid phase polymerization (the end temperature was 295° C.) was performed, thereby obtaining thermotropic liquid crystal polyester (O). The melting point of the obtained thermotropic liquid crystal polyester was 320° C.

Comparative Example 9

Preparation of Liquid Crystal Polyester Amide (P)

1546.94 g (11.20 mol) of p-hydroxybenzoic acid (manufactured by Ueno Fine Chemicals Industry Co., Ltd.), 120.94 g (0.80 mol) of acetaminophen (manufactured by Mallinckrodt Pharmaceuticals), 297.94 g (1.60 mol) of 4,4'-dihydroxybiphenyl (manufactured by Honshu Chemical Industry Co., Ltd.), 275.49 g (1.60 mol) of 1,4-cyclohexane dicarboxylic acid (manufactured by Eastman Chemical Company), and 132.90 g (0.80 mol) of isophthalic acid (manufactured by AG International Chemical Co., Inc.), and as a catalyst, 0.16 g of potassium acetate (Kishida Chemical Co., Ltd.) and 0.48 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1629.36 g (15.96 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 300° C.), the solid phase polymerization (the end temperature was 290° C.) was performed, thereby obtaining thermotropic liquid crystal polyester amide (P). The melting point of the obtained thermotropic liquid crystal polyester amide was 330° C.

Comparative Example 10

Preparation of Liquid Crystal Polyester Amide (Q)

110.50 g (0.8 mol) of p-hydroxybenzoic acid (manufactured by Ueno Fine Chemicals Industry Co., Ltd.), 193.50 g (1.28 mol) of acetaminophen (manufactured by Mallinckrodt Pharmaceuticals), 297.94 g (1.60 mol) of 4,4'-dihydroxybiphenyl (manufactured by Honshu Chemical Industry Co., Ltd.), 519.72 g (4.72 mol) of hydroquinone (manufactured by Ube Industries, Ltd.), 275.49 g (1.60 mol) of 1,4-cyclohexane dicarboxylic acid (manufactured by Eastman Chemical Company), 677.81 g (4.08 mol) of terephthalic acid (manufactured by Mitsui Chemicals, Inc.), and 318.97 g (1.92 mol) of isophthalic acid (manufactured by AG International Chemical Co., Inc.), and as a catalyst, 0.32 g of potassium acetate (Kishida Chemical Co., Ltd.) and 0.96 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1622.99 g (15.90 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 305° C.), the optical anisotropy was confirmed by a polarization microscope, infusible crystals remained at 400° C., and uniform liquid crystals were not obtained.

Comparative Example 11

Preparation of Liquid Crystal Polyester Amide (R)

1104.96 g (8.00 mol) of p-hydroxybenzoic acid (manufactured by Ueno Fine Chemicals Industry Co., Ltd.), 193.50 g (3.20 mol) of acetaminophen (manufactured by Mallinckrodt Pharmaceuticals), 297.94 g (1.60 mol) of 4,4'-dihydroxybiphenyl (manufactured by Honshu Chemical Industry Co., Ltd.), 550.98 g (3.20 mol) of 1,4-cyclohexane dicarboxylic acid (manufactured by Eastman Chemical Company), and 132.90 g (0.80 mol) of isophthalic acid (manufactured by AG International Chemical Co., Inc.), and as a catalyst, 0.16 g of potassium acetate (Kishida Chemical Co., Ltd.) and 0.48 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1372.09 g (13.44 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 290° C.), the optical anisotropy was confirmed by a polarization microscope, infusible crystals remained at 400° C., and uniform liquid crystals were not obtained.

Comparative Example 12

Preparation of Liquid Crystal Polyester Amide (S)

441.98 g (3.20 mol) of p-hydroxybenzoic acid (manufactured by Ueno Fine Chemicals Industry Co., Ltd.), 193.50 g (1.28 mol) of acetaminophen (manufactured by Mallinckrodt Pharmaceuticals), 297.94 g (1.60 mol) of 4,4'-dihydroxybiphenyl (manufactured by Honshu Chemical Industry Co., Ltd.), 387.59 g (3.52 mol) of hydroquinone (manufactured by Ube Industries, Ltd.), 688.72 g (4.00 mol) of 1,4-cyclohexane dicarboxylic acid (manufactured by Eastman Chemical Company), 132.90 g (0.80 mol) of terephthalic acid (manufactured by Mitsui Chemicals, Inc.), and 265.81 g (1.60 mol) of isophthalic acid (manufactured by AG International Chemical Co., Inc.), and as a catalyst, 0.32 g of potassium acetate (Kishida Chemical Co., Ltd.) and 0.96 g of magnesium acetate (Kishida Chemical Co., Ltd.) were put into a polymerization tank having an inner volume of 6 L with a double helical stirring blade (manufactured by Nitto high pressure, Co., Ltd.) made from SUS316, and after nitrogen substitution was carried out by performing reduction of pressure-nitrogen injection with respect to the polymerization tank 3 times, 1622.99 g (15.90 mol) of acetic anhydride was further added thereto, the temperature was raised to 150° C. over 1.5 hours while the stirring blade was rotated at a rotational speed of 70 rpm, and then acetylation reaction was carried out for 2 hours at reflux conditions.

Next, after a prepolymer was obtained in the same manner as in Example 1 (the reactor temperature when being taken out was 305° C.), the solid phase polymerization was performed, however, since the prepolymer adhered to the wall surface during the polymerization, it was not possible to obtain liquid crystal polyester amide (S).

TABLE 1

| | Polyester amide | (1) HBA | (2) AAP | (3) CHDA | (4) BP | (4) HQ | (5) TPA | (5) IPA | Melt polymerization taking out temperature (° C.) | Solid phase polymerization end temperature (° C.) | Melting point (° C.) |
|---|---|---|---|---|---|---|---|---|---|---|---|
| Example 1 | A | 60 | 5 | 10 | 15 | | 7 | 3 | 305 | 300 | 325 |
| Example 2 | B | 60 | 8 | 10 | 12 | | 5 | 5 | 300 | 300 | 335 |
| Example 3 | C | 20 | 8 | 10 | 10 | 22 | 22 | 8 | 305 | 320 | 360 |
| Example 4 | D | 60 | 5 | 5 | 15 | | 10 | 5 | 310 | 310 | 340 |
| Example 5 | E | 65 | 5 | 10 | 12.5 | | 4.5 | 3 | 305 | 300 | 325 |
| Example 6 | F | 10 | 8 | 10 | 10 | 27 | 25 | 10 | 310 | 320 | 350 |
| Example 7 | G | 50 | 17.5 | 20 | 7.5 | | | 5 | 290 | 295 | 350 |

TABLE 2

| | Polyester | (1) HBA | (2) AAP | (3) CHDA | (4) BP | (4) HQ | (4) 2,6-naphthalenediol | (5) TPA | (5) IPA | Melt polymerization taking out temperature (° C.) | Solid phase polymerization end temperature (° C.) | Melting point (° C.) |
|---|---|---|---|---|---|---|---|---|---|---|---|---|
| Comparative Example 1 | H | 60 | | | 20 | | | 15 | 5 | 310 | 320 | 355 |
| Comparative Example 2 | I | 20 | | | 10 | 30 | | 27 | 13 | 310 | 310 | 340 |
| Comparative Example 3 | J | 60 | | 20 | 20 | | | | | 310 | 300 | 345 |
| Comparative Example 4 | K | 60 | | 10 | 20 | | | 7 | 3 | 310 | 295 | 335 |
| Comparative Example 5 | L | 20 | | 10 | 40 | | | 15 | 15 | 310 | 300 | 325 |
| Comparative Example 6 | M | 60 | 2 | 10 | 18 | | | 7 | 3 | 310 | 295 | 330 |
| Comparative Example 7 | N | 60 | 5 | 2 | 15 | | | 13 | 5 | 310 | 315 | 355 |
| Comparative Example 8 | O | 60 | 10 | 10 | | | 10 | 10 | | 300 | 295 | 320 |
| Comparative Example 9 | P | 70 | 5 | 10 | 10 | | | | 5 | 300 | 290 | 330 |
| Comparative Example 10 | Q | 5 | 8 | 10 | 10 | 29.5 | | 25.5 | 12 | 305 | Uniform liquid crystal was not obtained | |
| Comparative Example 11 | R | 50 | 22 | 20 | 3 | | | | 5 | 290 | Uniform liquid crystal was not obtained | |
| Comparative Example 12 | S | 20 | 8 | 25 | 10 | 22 | | 5 | 10 | 305 | Adhered to the wall surface, solid phase polymerization is not possible | |

In Tables 1 and 2, HBA represents p-hydroxybenzoic acid, AAP represents acetaminophen, CHDA represents 1,4-cyclohexane dicarboxylic acid, BP represents 4,4'-dihydroxybiphenyl, HQ represents hydroquinone, TPA represents terephthalic acid, and IPA represents isophthalic acid.

The melting points of the polyester amide and the polyester were measured by the following method.

(Measurement of Melting Point)

The melting points of the polyester amide and the polyester were measured by a differential scanning calorimeter (DSC) manufactured by SEIKO Electronics Industrial Co., Ltd. using α-alumina as a reference. At this time, after the polymer was completely melted by being heated from room temperature to 420° C. at a temperature raising rate of 20° C./min, the temperature was lowered to 80° C. at a rate of 10° C./min, and raised to 420° C. again at a rate of 20° C./min. An apex of the endothermic peak obtained at this time was taken as the melting point.

The optical anisotropy of the polyester amide and the polyester was confirmed by the following method.

(Confirmation of Optical Anisotropy)

Using a polarization microscope BH-2 manufactured by Olympus Corporation equipped with a microscope cooling and heating stage 10002 type for a microscope manufactured by Japan High Tech Co., Ltd., a polyester sample was heated to melt on the microscope heating stage, and the presence or absence of optical anisotropy was confirmed by observation at 100 times and 200 times magnification at the time of melting.

<Preparation of Resin Composition>

Example 8

50 parts by mass of glass fiber (PX-1, manufactured by Owens Corning Corporation), 15 parts by mass of talc (MSKY, manufactured by Nippon Talc Co., Ltd), and 1.67 parts by mass of carbon black (REGAL 99, manufactured by Cabot Corporation) with respect to 100 parts by mass of the liquid crystal polyester amide (A) obtained above were mixed in advance, and the mixture was dried at 150° C. for 2 hours in an air oven. The dried mixture was supplied into a hopper of a twin screw extruder which set at a cylinder maximum temperature of 370° C. (PCM-30, manufactured by Ikegai Steel Co., Ltd.), and melted and kneaded at 15 kg/hr, thereby obtaining a pellet of a liquid crystal polyester amide resin composition.

Examples 9 to 14

By the same equipment and operation procedures as in Example 8 except that each liquid crystal polyester amide (B) to (G) was used instead of the liquid crystal polyester amide (A), each pellet of the liquid crystal polyester amide resin composition was obtained.

Comparative Examples 13 to 17

By the same equipment and operation procedures as in Example 8 except that each liquid crystal polyester (H) to (L) was used instead of the liquid crystal polyester amide (A), each pellet of a liquid crystal polyester resin composition was obtained.

Comparative Examples 18 to 21

By the same equipment and operation procedures as in Example 8 except that each liquid crystal polyester amide (M) to (P) was used instead of the liquid crystal polyester amide (A), each pellet of the liquid crystal polyester amide resin composition was obtained. Moreover, since a uniform polymer was not obtained for the liquid crystal polyester amides (Q) to (S), pellets of the resin compositions were not prepared.

TABLE 3

|  | Polyester amide or polyester | Izod impact strength (no notch) kJ/m$^2$ | Tensile strength MPa | Tensile modulus MPa | Tensile elongation % | Bending strength MPa | Bending modulus MPa | DTUL % |
|---|---|---|---|---|---|---|---|---|
| Example 8 | A | 64 | 118 | 12.400 | 3.6 | 151 | 10.900 | 267 |
| Example 9 | B | 65 | 126 | 13.100 | 3.6 | 157 | 11.500 | 251 |
| Example 10 | C | 66 | 122 | 12.700 | 3.5 | 152 | 10.800 | 244 |
| Example 11 | D | 60 | 127 | 14.800 | 3.1 | 160 | 12.000 | 273 |
| Example 12 | E | 63 | 119 | 12.700 | 3.5 | 150 | 11.200 | 268 |
| Example 13 | F | 65 | 120 | 13.000 | 3.5 | 149 | 11.100 | 243 |
| Example 14 | G | 63 | 129 | 12.400 | 3.5 | 163 | 10.800 | 283 |
| Comparative Example 13 | H | 49 | 130 | 18.900 | 2.0 | 173 | 14.300 | 280 |
| Comparative Example 14 | I | 36 | 129 | 17.700 | 1.6 | 188 | 14.800 | 248 |
| Comparative Example 15 | J | 61 | 72 | 8.700 | 3.8 | 96 | 7.600 | 278 |
| Comparative Example 16 | K | 60 | 85 | 12.200 | 3.5 | 120 | 10.400 | 276 |
| Comparative Example 17 | L | 42 | 80 | 12.600 | 2.8 | 116 | 10.800 | 265 |
| Comparative Example 18 | M | 61 | 90 | 12.200 | 3.5 | 127 | 10.500 | 270 |
| Comparative Example 19 | N | 51 | 137 | 19.400 | 2.2 | 185 | 15.100 | 278 |
| Comparative Example 20 | O | 40 | 98 | 17.100 | 1.6 | 134 | 13.700 | 225 |
| Comparative Example 21 | P | 35 | 85 | 13.400 | 2.1 | 118 | 11.300 | 270 |

<Manufacturing of Test Pieces by Injection Molding Method>

Using an injection molding machine (SG-25, manufactured by Sumitomo Heavy Industries, Ltd.), the pellets of the resin compositions obtained in Examples and Comparative Examples described above were injection-molded at the cylinder maximum temperature of 360° C., an injection rate of 100 mm/sec, and a mold temperature of 80° C., thereby manufacturing test pieces for tensile test according to ASTM D638. These test pieces were used as test pieces for measurement of tensile strength, tensile modulus, and tensile elongation. In addition, injection molding was carried out under the same conditions described above, bending test pieces according to ASTM D790 were made, and the test pieces were used as test pieces for measurement of bending strength, bending modulus, load deflection temperature (DTUL), and Izod impact strength.

The tensile strength, the tensile modulus, the tensile elongation, the bending strength, the bending modulus, the load deflection temperature (DTUL), and the Izod impact strength of each test piece obtained above were measured in the following manner. The results are shown in Table 3.

(Measurement of Tensile Strength, Tensile Modulus, and Tensile Elongation)

Using the test pieces manufactured above, the tensile strength, the tensile modulus, and the tensile elongation were measured according to ASTM D638.

(Measurement of Bending Strength and Bending Modulus)

Using the test pieces for the bending test manufactured above, the bending strength and bending modulus were measured according to ASTM D790.

(Measurement of Load Deflection Temperature)

Using the test pieces for the bending test manufactured above, the load deflection temperature (DTUL) was measured according to ASTM D648.

(Measurement of Izod Impact Strength)

Using the test pieces for the bending test manufactured above, the Izod impact strength (no notch) was measured according to ASTM D256.

Figure 2:
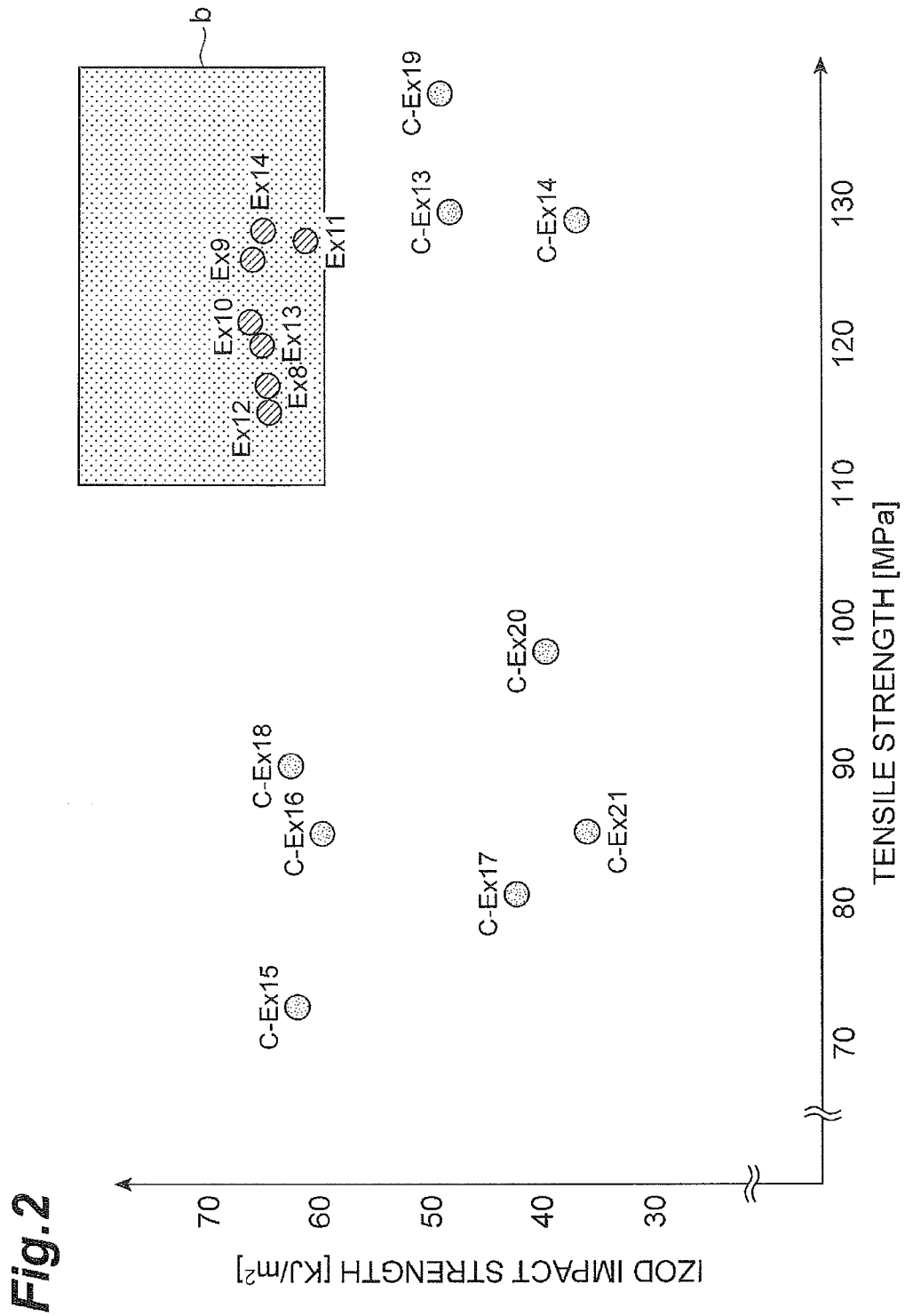
FIG. 2 is a graph showing the relationship between the Izod impact strength and the tensile strength of the molded articles obtained in Examples and Comparative Examples.

FIG. 1 shows the relationship between the Izod impact strength and the tensile elongation of the molded articles injection-molded using the resin compositions obtained in Examples 8 to 14 and Comparative Examples 13 to 21. In addition, FIG. 2 shows the relationship between the Izod impact strength and the tensile strength of the molded articles obtained in Examples 8 to 14 and Comparative Examples 13 to 21. The area a in FIG. 1 shows a range in which the Izod impact strength is 60 kJ/m$^2$ or greater, and the tensile elongation is 3.0% or greater. In addition, the area b in FIG. 2 shows a range in which the Izod impact strength is 60 kJ/m$^2$ or greater, and the tensile strength is 110 MPa or greater.

It was confirmed that in the resin compositions in Examples 8 to 14, the requirement of the area a and the area b are satisfied, and it was found that all of the flexibility, the toughness and the strength are excellent. In addition, as shown in Table 3, DTUL is higher than 240° C., and the heat resistance is sufficient.

On the other hand, it was found that in the resin compositions in Comparative Examples 13 to 21 which do not have a configuration according to the present invention, the flexibility, the toughness and the strength were not balanced. In the resin compositions of Comparative Examples 13, 14, 19, 20, and 21, both the Izod impact strength and tensile elongation were low, and the toughness and the flexibility were poor. In addition, in the resin compositions of Comparative Examples 15, 16, and 18, the Izod impact strength and tensile elongation were slightly high, the tensile strength was low, and the toughness is present while the strength thereof was not sufficient. In the resin composition of Comparative Example 17, elongation was slightly present, however, both the Izod impact strength and the tensile strength were low, and both the toughness and the strength were not sufficient.

<Manufacturing of Bending Strength and Bending Deflection Test Pieces with Thickness of 0.5 Mm by Injection Molding Method>

Using an injection molding machine (SE30DU, manufactured by Sumitomo Heavy Industries, Ltd.), the pellets of the resin compositions obtained in Examples and Comparative Examples described above were injection-molded at the cylinder maximum temperature of 360° C., an injection rate of 100 mm/sec, and a mold temperature of 80° C., thereby forming strip-shaped test pieces having a length of 40 mm, a width of 13 mm, and a thickness of 0.5 mm. The test pieces with a thickness of 0.5 mm were used as test pieces for measuring the bending strength and the bending deflection.

<Measurement of Bending Strength and Bending Deflection>

Using the test pieces for measuring the bending strength and the bending deflection with a thickness of 0.5 mm manufactured above, a three-point bending test standardized in ASTM D790 was carried out on the test pieces. However, as a change point from ASTM D790, the distance between supports was set to 25 mm, and a test speed was set to 1.27 mm/min. In addition, a maximum bending strength to test piece to be ruptured was defined as "bending strength", and operating width of the indenter to rupture was defined as "bending deflection". The results are shown in Table 4 and FIG. 3.

TABLE 4

|  | Polyester amide or polyester | 0.5 mm thickness bending strength MPa | 0.5 mm thickness bending deflection mm |
|---|---|---|---|
| Example 8 | A | 198 | 6.6 |
| Example 9 | B | 211 | 6.5 |
| Example 10 | C | 207 | 6.7 |
| Example 11 | D | 215 | 5.8 |
| Example 12 | E | 199 | 6.5 |
| Example 13 | F | 195 | 6.4 |
| Example 14 | G | 218 | 6.6 |
| Comparative Example 13 | H | 226 | 4.0 |
| Comparative Example 14 | I | 230 | 3.3 |
| Comparative Example 15 | J | 135 | 6.6 |
| Comparative Example 16 | K | 156 | 6.0 |
| Comparative Example 17 | L | 150 | 5.0 |
| Comparative Example 18 | M | 155 | 6.1 |
| Comparative Example 19 | N | 235 | 4.3 |
| Comparative Example 20 | O | 152 | 3.4 |
| Comparative Example 21 | P | 128 | 3.8 |

Figure 3:
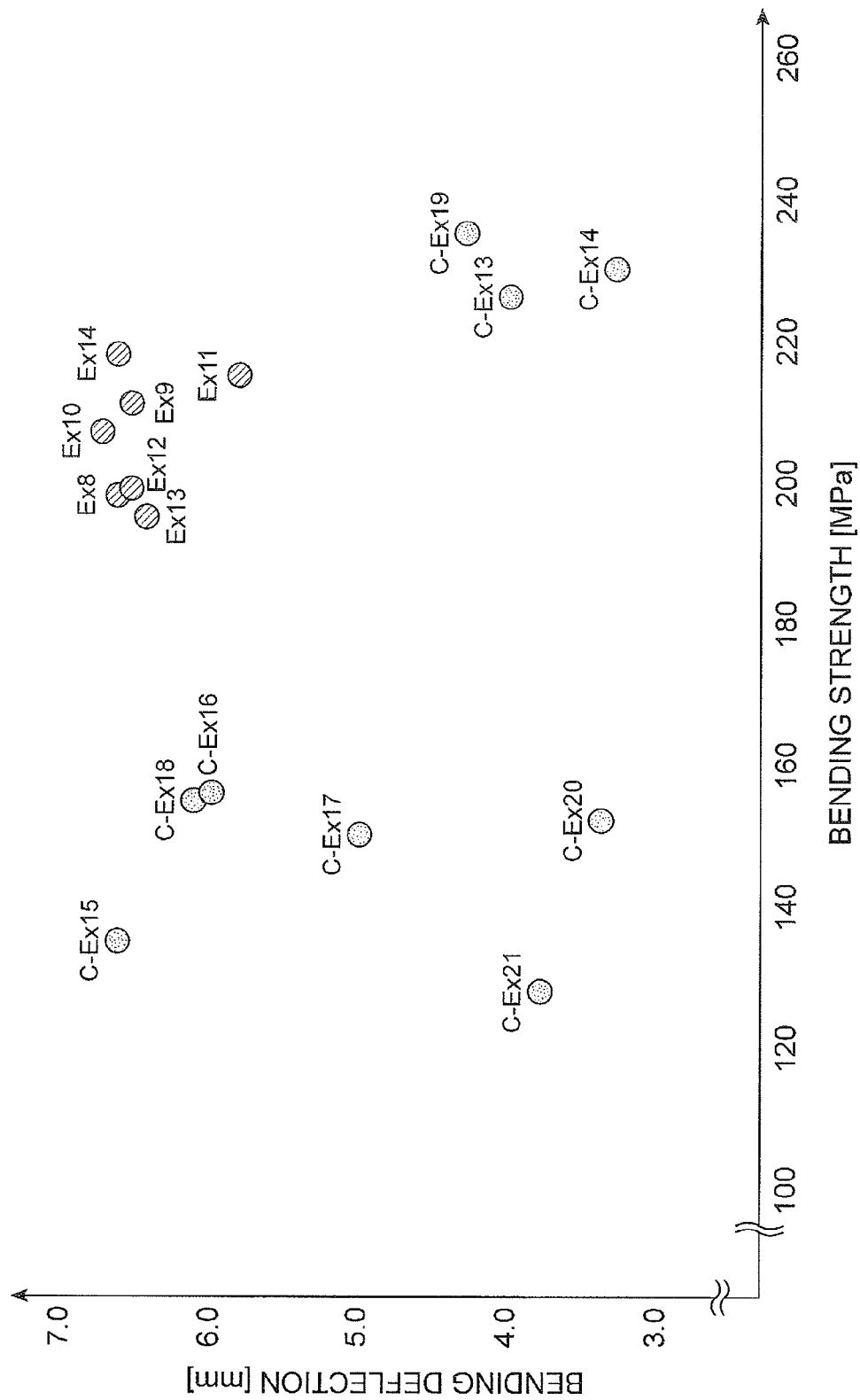
FIG. 3 is a graph showing a relationship between bending deflection and bending strength of injection-molded articles with a thickness of 0.5 mm obtained in Examples and Comparative Examples.

From the results shown in Table 4 and FIG. 3, it is found that the injection-molded articles with a thickness of 0.5 mm including liquid crystal polyester amides according to the present invention have great "bending deflection" to be fractured great "bending strength" before fracturing, and both the toughness and the strength.

INDUSTRIAL APPLICABILITY

According to the present invention, it is possible to provide the liquid crystal polyester amide which has an excellent fluidity, and can form a molded article which has sufficient heat resistance, toughness and strength, and strong flexibility to deformation, and the liquid crystal polyester amide resin composition. It is possible to impart sufficient flexibility, toughness and strength in a part which is thin wall-molded such as an external connector of a mobile terminal or the like by injection-molding using the resin compositions.

The invention claimed is:

1. A liquid crystal polyester amide resin composition, comprising:
   a liquid crystal polyester amide having a melting point of 300° C. or higher, comprising:
      10 mol % to 65 mol % of a structural unit represented by the following formula (1);
      3 mol % to 17.5 mol % of a structural unit represented by the following formula (2);
      5 mol % to 20 mol % of a structural unit represented by the following formula (3);
      7.5 mol % to 42 mol % of at least one of a structural unit represented by the following formula (4-1) and a structural unit represented by the following formula (4-2); and
      2.5 mol % to 40 mol % of at least one of a structural unit represented by the following formula (5-1) and a structural unit represented by the following formula (5-2); and
   5 parts by mass to 250 parts by mass with respect to 100 parts by mass of the liquid crystal polyester amide of an inorganic filler; and
   wherein an Izod impact strength of a molded article formed of the liquid crystal polyester amide resin composition is 60 kJ/m² or greater and a tensile strength of the molded article is 110 MPa or greater

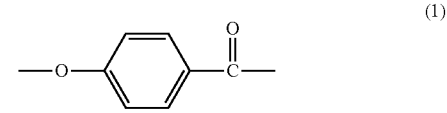
(1)

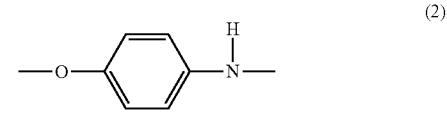
(2)

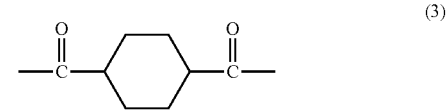
(3)

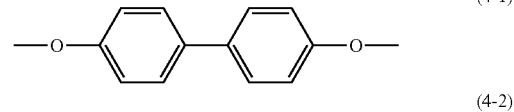
(4-1)

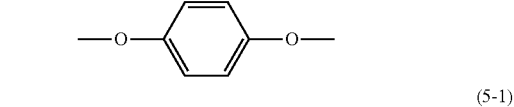
(4-2)

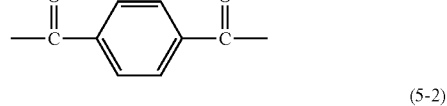
(5-1)

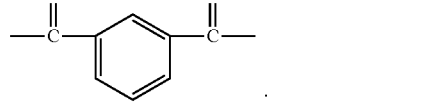
(5-2)

2. A molded article formed of the liquid crystal polyester amide resin composition according to claim 1.

3. The molded article according to claim 2, having a load deflection temperature of 240° C. or higher.

4. The molded article according to claim 2, having a tensile elongation of 3.0% or greater.

5. The molded article according to claim 2, having a tensile modulus of 15,000 MPa or less.

6. The molded article according to claim 2, having a bending modulus of 13,000 MPa or less.

7. An injection-molded article which is formed of the liquid crystal polyester amide resin composition according to claim 1 and includes a thin-wall portion having a thickness of 0.05 mm to 0.5 mm.

8. The liquid crystal polyester amide resin composition according to claim 1, wherein a load deflection temperature of a molded article formed of the liquid crystal polyester amide resin composition is 240° C. or higher.

9. The liquid crystal polyester amide resin composition according to claim 1, wherein a tensile elongation of a molded article formed of the liquid crystal polyester amide resin composition is 3.0% or greater.

10. The liquid crystal polyester amide resin composition according to claim 1, wherein a tensile modulus of a molded article formed of the liquid crystal polyester amide resin composition is 15,000 MPa or less.

11. The liquid crystal polyester amide resin composition according to claim 1, wherein a bending modulus of a molded article formed of the liquid crystal polyester amide resin composition is 13,000 MPa or less.

12. The liquid crystal polyester amide resin composition according to claim 1, wherein a bending strength of a molded article formed of the liquid crystal polyester amide resin composition is 140 MPa or greater.

13. The liquid crystal polyester amide resin composition according to claim 1, wherein a bending modulus of a molded article formed of the liquid crystal polyester amide resin composition is 13,000 MPa or less and a bending strength of the molded article is 140 MPa or greater.

* * * * *